United States Patent [19]

Yasuda et al.

[11] Patent Number: 4,700,377

[45] Date of Patent: Oct. 13, 1987

[54] SELECTIVELY ACTUABLE ELECTRONIC APPARATUS

[75] Inventors: Hiroshi Yasuda, Kanagawa; Kanji Ohnishi; Satoshi Yokoya, both of Tokyo, all of Japan; Jon Strom, Glen Ridge, N.J.

[73] Assignee: Sony Corporation, Tokyo, Japan

[21] Appl. No.: 784,472

[22] Filed: Oct. 4, 1985

[51] Int. Cl.[4] ............ H04M 1/56; H04M 1/30; G09G 1/00

[52] U.S. Cl. ................. 379/88; 379/88; 379/354; 379/368; 340/365 R; 340/711; 364/513.5; 381/51

[58] Field of Search ........... 179/90 AN, 90 K, 99 H, 179/81 R, 99 R, 168, 158 R; 340/365 R, 691, 692, 384 E, 328; 200/1 B, 5 A, 159 B; 379/396, 422, 423, 368, 263; 381/51, 52, 53; 364/513.5

[56] References Cited

U.S. PATENT DOCUMENTS

| | | | |
|---|---|---|---|
| 4,028,695 | 6/1977 | Saich | 340/365 R |
| 4,310,839 | 1/1982 | Schwerdt | 340/365 R |
| 4,453,040 | 6/1984 | Wolf et al. | 179/81 C |
| 4,489,310 | 12/1984 | Trotsyanetsky | 340/365 VL |
| 4,494,110 | 1/1985 | Wakeling et al. | 340/365 R |

FOREIGN PATENT DOCUMENTS 0015556 1/1982 Japan .............. 179/90 AN
2100517 12/1982 United Kingdom ............ 200/159 B Primary Examiner—Stewart J. Levy
Assistant Examiner—Lawrence G. Fess
Attorney, Agent, or Firm—Lewis H. Eslinger; Alvin Sinderbrand

[57] ABSTRACT

An electronic apparatus includes a plurality of selectively actuable selection devices for causing the apparatus to perform a plurality of distinct operations. A first actuation of a selection device establishes a first condition to cause the apparatus to generate an externally detectable identification such as by voice synthesis of the selected operation, and a second actuation of the selection device establishes a second condition to cause the apparatus to perform the selected operation and identify the operation on a display. In a preferred embodiment, the selection devices are each a push button actuable from a rest position to a first depressed position to establish the first condition by actuating a first switch, and thereafter actuable from the first depressed position to a second depressed position to establish the second condition by actuating a second switch.

11 Claims, 4 Drawing Figures

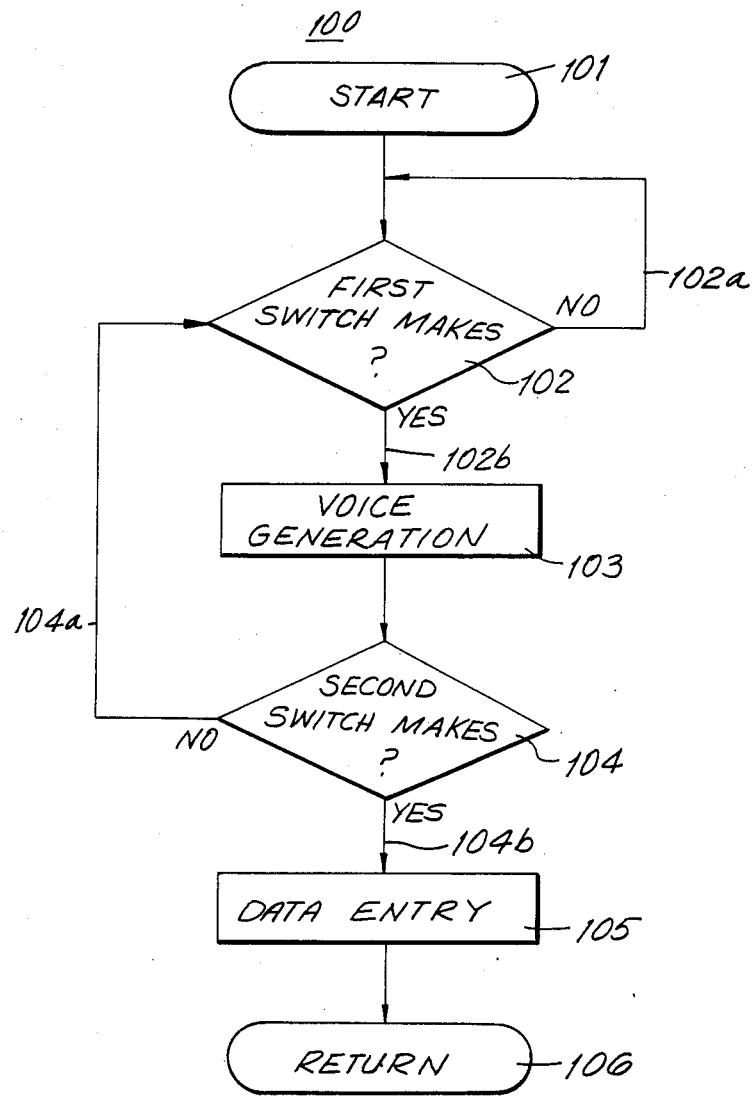

SELECTIVELY ACTUABLE ELECTRONIC APPARATUS

BACKGROUND OF THE INVENTION

1. Field of the Invention

This invention relates to electronic apparatus for selectively performing different operations in response to actuation of keys on a keyboard.

2. Description of the Prior Art

Many types of electronic apparatus are operated by selective actuation of push buttons or touch operated keys on a keyboard panel to perform a variety of operations. One example of such an electronic apparatus is a telephone, which dials different numbers in response to actuation of correspondingly numbered keys. Another example is a radio, which is tuned to different broadcast stations in response to information entered by actuating the various keys. In fact, almost all types of electronic apparatus which perform at least two distinct operations will generally have some form of keyboard panel through which the operator's selection may be entered.

Customarily, each key on the keyboard bears an indication of the corresponding operation to inform the operator of what will occur upon actuation of that key. For example, each key on the telephone keyboard bears the number corresponding to the digit dialled in response to actuation. In a radio, some keys may bear the number of a memory location containing the frequency to which the radio will be tuned upon actuation, or a key may bear an arrow indicating a frequency scanning direction.

It is now possible to have a variety of such electronic apparatus installed in the dashboard of an automobile for operation by the driver. It is essential for safe driving that the driver be able to keep his eyes on the road, while at the same time selecting the appropriate key. Therefore, a keyboard device has been proposed in which the top of each key has a differently shaped convex surface, identifiable by touch, so that the driver can identify each key without looking at it. Unfortunately, this still requires a degree of concentration which is distracting, and this type of keyboard device is frequently misoperated.

A second type of keyboard device has been proposed in which a different beep tone is generated in response to actuation of each key to identify the operation. A variation thereof has the actuated key being lit up. However, the different beeps/lights are generated only after actuation, that is, after performance of the operation, and serve only to identify which operation has been performed. This keyboard device does not aid the operator in deciding beforehand which key to actuate, and so does not aid in avoiding misoperation.

OBJECTS AND SUMMARY OF THE INVENTION

Accordingly, it is an object of this invention to provide an electronic apparatus which may be actuated to perform a selected operation in a manner which avoids the above-described difficulties of the prior art.

Another object of this invention is to provide such an electronic apparatus in which an identification of a selected operation is provided before the apparatus performs the selected operation, so that an improperly selected operation may be avoided.

Yet another object of this invention is to provide such an electronic apparatus wherein this identification is provided audibly, so that the operator need not look at the electronic apparatus in order to operate it properly.

According to one aspect of the present invention, there is provided an electronic apparatus for selectively performing a plurality of operations comprising a plurality of selectively actuable selection means for selecting respective ones of the operations, each selection means being initially actuable to establish a first condition and being thereafter actuable to establish a second condition, means responsive to the first condition of each selection means for generating an externally detectable identification of the respective one of the operations and means responsive to the second condition of each of the selection means for performing the respective one of the operations. In a preferred embodiment, the selection means are each push button actuable from a rest position to a first depressed position to establish the first condition by actuating a first switch, and thereafter actuable from the first depressed position to a second depressed position to establish the second condition by actuating a second switch.

The above, and other objects, features and advantages of the present invention, will become apparent from the following detailed description taken in conjunction with the attached drawings.

BRIEF DESCRIPTION OF THE DRAWINGS

FIG. 4 is a flow chart of a control program of a control means of the apparatus of FIG. 1.

DETAILED DESCRIPTION OF THE INVENTION

Figure 1:
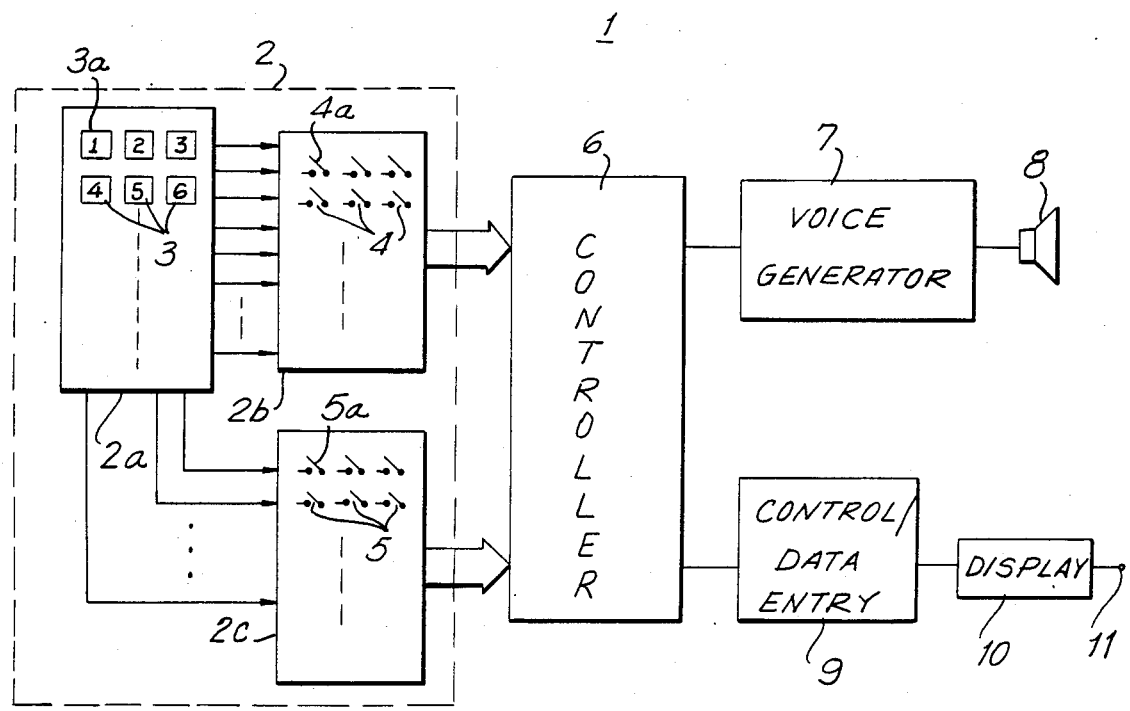
FIG. 1 is a schematic illustration of an electronic apparatus according to an embodiment of the present invention.

Referring now to the drawings, and initially to FIG. 1 thereof, an electronic apparatus according to the present invention is illustrated as a telephone 1. It will be appreciated that the present invention could be advantageously embodied in a radio or any other electronic apparatus selectively actuable to perform at least two distinct operations.

Telephone 1 includes a keyboard device 2 having a keyboard panel 2a and first and second switch arrays 2b, 2c. Keyboard panel 2a includes a number of push buttons or touch operated keys 3, first switch array 2b includes the same number of first switches 4, and second switch array 26 includes the same number of second switches 5.

Each push button 3 corresponds to and identifies a single operation of telephone 1. In the following discussion, it will be assumed that the dialling of a single digit of telephone number constitutes a single distinct operation of telephone 1. It is known to provide a telephone with a "redial" push button whose actuation causes the entire last telephone number to be redialled. Similarly, a telephone may contain a memory for storing selected telephone numbers, and one of these telephone numbers may be dialled by actuating a single push button. In such cases, the dialling of the entire telephone number may be regarded as a single operation of telephone 1, and as such is advantageously performed by the apparatus according to the present invention. For the present discussion and for simplicity, however, the dialling of a single digit will be considered the single operation.

Push button 3a illustrated in FIG. 1 bears the numeral "1", and the operation it corresponds to is the dialling of the single digit "1" in a telephone number. The remaining illustrated push buttons 3 bear the numerals "2", "3", "4", "5", and "6", to identify the digits of a telephone number which are dialed upon actuation of the respective push buttons 3. Of course, a practical telephone 1 will include an entire ten-key panel.

Each push button 3, such as push button 3a, is associated with one first switch 4, here first switch 4a, and one second switch 5, here second switch 5a, to form a selectively actuable selection device, as will be described in detail below.

First switches 4 each generate a respective first control signal when actuated. In the illustrated embodiment, each first switch 4 is normally open and is actuated to be closed, thus generating the first control signal when in the closed position. Second switches 5 are correspondingly constructed to generate respective second control signals when actuated. Actuation of any of first switches 4 and the generation of the respective first control signal establishes a first condition of telephone 1, while actuation of any of second switches 5 and the generation of the respective second control signal establishes a second condition of telephone 1. The first and second control signals from switches 4, 5 are supplied to a controller 6, which advantageously is a suitably programmed microprocessor or micro computer. In accordance with conventional switch arrays, each first and second control signal is supplied to controller 6 so as to enable controller 6 to identify which switch has been actuated. Controller 6 is responsive to the first and second control signals received from first switches 4, 5 to control the operations of a synthesizer 7, which in the illustrated embodiment is a voice signal generator 7, a loudspeaker 8, an apparatus control 9 and a visual display device 10, in a manner described in detail below. In particular, voice signal generator 7 and loudspeaker 8 are jointly responsive to control signals from controller 6 to produce audible words or tones identifying the selected operations.

Figure 2:
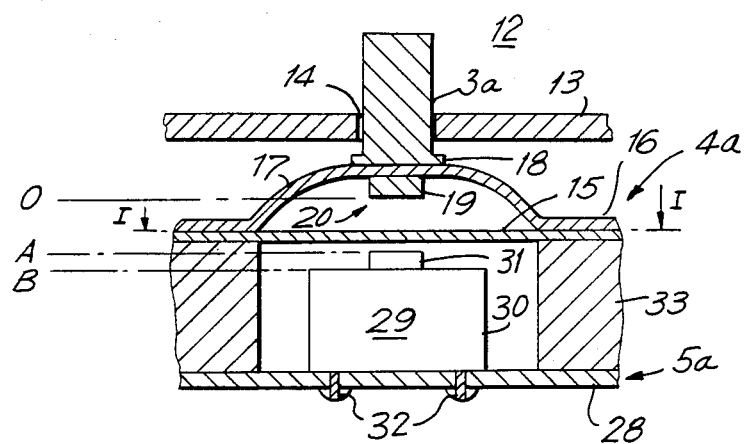
FIG. 2 is a cross-sectional view of a preferred embodiment of a selection means of the apparatus of FIG. 1.
Figure 3:
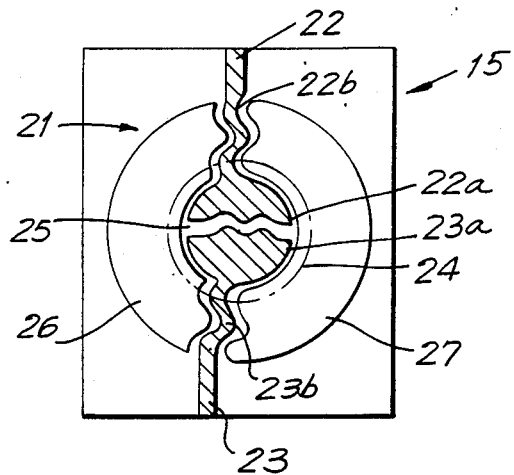
FIG. 3 is a cross-sectional view of the selection means taken along line I—I on FIG. 2.

In the illustrated embodiment, push buttons 3 are mechanical pushbuttons which are actuated by manual depression from a rest position to a first depressed position, and then to a second, further depressed position as illustrated in FIGS. 2 and 3. Since all of push buttons 3 and their connections to associated first and second switches 4, 5 are identical, a description will be given only of the structure and operation of push button 3a, first switch 4a and second switch 5a. It will be appreciated that the following description applies to each selection means individually.

The operation of telephone 1 in response to actuation of push button 3a will be described functionally first, and then a description of the structure providing such functions will be given.

The first actuation of push button 3a from its rest position to its first depressed position causes first switch 4a to close. The first depressed position is physically detectable by touch, for example, in that a certain pressure will move push button 3a to the first depressed position, but no farther, and only increased pressure will move push button 3a to the second depressed position. The corresponding first control signal is supplied to controller 6 and identifies therein the respective selected operation, in the present example, the dialing of digit "1". Controller 6 is responsive to this first control signal which establishes the first condition of telephone 1, to supply a further control signal to voice signal generator 7 to cause the same to generate a voice signal indicative of the identity of the selected operation. The voice signal is supplied to loud-speaker 8, which audibly produces the identification in the form of words. For example, synthesizer 7 may be responsive to signals from controller 6 to generate a voice signal indicative of the word "one". Loudspeaker 8 is responsive to the voice signal to audibly produce the word "one". Thus, the first actuation of push button 3a to its first depressed position will cause the word "one" to be audibly produced. The driver of the automobile is thereby apprised of the operation he has selected without having to take his eyes from the road. Significantly, at this time, the selected operation, i.e. dialing "1", has not yet been performed, nor must it necessarily be performed. Instead, the driver could release push button 3a, allowing it to move back to its rest position and thereby reopen first switch 4a, without the digit "1" having been dialed and ending the first condition. Thus, if the driver did not intend to dial "1", he is warned of his error before the digit has been dialed, and so he can avoid misoperating telephone 1.

Once the driver has heard the audible confirmation of the selected operation, he may then decide to have the selected operation performed. To this end, he again actuates push button 3a by exerting greater pressure and depresses it further from its first depressed position to its second depressed position, thereby closing second switch 5a. A respective second control signal, which establishes the second condition of telephone 1, is supplied to controller 6, which is responsive thereto to control the operations of apparatus control 9 and display device 10.

In particular, apparatus control 9 is constituted in part by the conventional control system of telephone 1. Such a conventional telephone control system is responsive to received signals for dialling digits of a telephone number, and handles any and all other conventional processing of telephone 1. As such, it does not constitute part of the present invention. The data entry portion of apparatus control 9 passes the control signals from controller 6 to display device 10 which may be a liquid crystal display, for example. Indeed, if first switch array 2b and controller 6 were eliminated, actuation of push button 3a causing the closure of switch 5a would cause a corresponding signal to be supplied directly to apparatus control 9, and a conventional push button telephone would result. A further discussion of the internal circuitry and operation of apparatus control 9 is therefore unrelated to the present invention and will not be provided. However, it will be appreciated that apparatus control 9 is responsive to each of the second control signals from second switches 5 to generate a conventional telephone signal indicative of the respective digit being dialled, which conventional telephone signal is transmitted to display device 10 and thence to a telephone network line 11 for transmission over the telephone system.

Display device 10 is responsive to the control signals from the data entry portion of apparatus control 9 to present a visual display of the corresponding digit. Thus, when push button 3a is actuated from its first depressed position to its second depressed position, switch 5a is actuated, that is, closed, and a respective second control signal is supplied to controller 6. Controller 6 generates an appropriate control signal and supplies the same to apparatus control 9 which then generates the conventional telephone signal, as described above, and display device 10 is responsive thereto to display the digit "1". In the same manner, any of the other digits illustrated on push buttons 3 may be dialled and displayed on display device 10. Display device 10 is adapted to store and display all digits of the telephone number being dialled, to provide a complete verification thereof.

A detailed description of a selectively actuable selection means according to the present invention will now be described with reference to FIGS. 2 and 3. Although the following description will be directed to the specific selection means 12 constituted by push button 3a, first switch 4a and second switch 5a, it will be understood that each of the remaining push buttons 3 has associated therewith first and second switches 4,5 to constitute a similar selection means according to the present invention.

Referring now to FIG. 2, selection means 12 is shown to have its push-button 3a slidably received in an aperture 14 of an upper panel 13 of keyboard panel 2a. First switch 4a includes a flexible circuit board 15 and a rubber sheet 16 having a flexible convex portion 17. Push button 3a contacts convex portion 17 of rubber sheet 16 at a lower end 18 thereof. Centered below lower end 18 on the undersurface of convex portion 17 is a first electrical contact 19. In the rest position of push-button 3a, space 20 separates first contact 19 from flexible board 15, and convex portion 17 normally resiliently maintains push button 3a in its rest position, indicated as level O in FIG. 2.

As illustrated in FIG. 3, flexible circuit board 15 includes a base plate 21 made of a thin plastic film with the top surface thereof having printed thereon a pattern of conductive material forming a respective pair of second electrical contacts 22,23. Second contacts 22, and 23 terminate in land portions 22a and 23a, respectively, which are centered below the respective first contact 19 within an area 24 on base plate 21 corresponding to the area contacted by first contact 19 when the same is moved down into contact with flexible circuit board 15. Land portions 22a and 23a are separated by a non-conductive portion 25 therebetween. In the illustrated embodiment, non-conductive portion 25 is constituted by a portion of base plate 21. Curved line portions 22b and 23b are formed to extend outwardly from land portions 22a, 23a, respectively, for connection to the electrical system of telephone 1 to transmit first control signals thereto. Cut-outs 26 and 27 of approximately semi-circular configuration, are formed in base plate 21 in order to increase the flexibility thereof. When first contact 19 is urged downwardly to contact flexible circuit board 15 at area 24, a conductive path from land portion 22a to land portion 23a is created through first contact 19, thus closing first switch 4a to generate the respective first control signal.

Second switch 5a includes a rigid circuit board 28 having printed conductive paths (not illustrated) on its lower surface connected to the electrical system of telephone 1 to transmit second control signals thereto. A switch assembly 29 mounted on the upper surface of rigid circuit board 28 includes a switch unit 30 and an actuator 31 moveably attached thereto and biased upwardly, for example by a spring (not illustrated). Electrical leads 32 from switch unit 30 extend through rigid circuit board 28 and are soldered to the conductive paths. When actuator 31 is depressed from its upper position, indicated by level A in FIG. 2, to its lower position, indicated by level B, leads 32 are electrically connected, thereby closing second switch 5a to generate the respective second control signal. Flexible circuit board 15 and rigid circuit board 28 are spaced away from each other by a spacer 33 such that there is normally a small gap between actuator 31 and the lower surface of flexible circuit board 15.

The operation of selection means 12 will now be described. In the absence of actuation, push button 3a is resiliently held in its rest position at level O by convex portion 17, as illustrated in FIG. 2. To actuate selection means 12, the operator pushes on push button 3a in the downward direction against convex portion 17 to bring first contact 19 into electrical contact with land portions 23a, 23b on flexible circuit board 15 (FIG. 3). An electrical path is thereby created between second contacts 22, 23, closing first switch 4a. Convex portion 17 is designed to have a greater resiliency than flexible circuit board 15, so that the amount of pressure required to move push button 3a down to bring first contact 19 down into electrical contact with second contacts 22, 23 is insufficient to cause substantial flexing of flexible circuit board 15. The operator, upon putting pressure on push button 3a, will feel the same move downwardly for a first distance, at which point he will feel resistance to further movement. Consequently, the operator can detect by touch when this first actuation is complete without proceeding to the second actuation. When switch 4a is closed, the respective first control signal is supplied to controller 6, as discussed above, to cause voice signal generator 7 to synthesize a voice signal indicative of the word "one", whereupon loudspeaker 8 audibly produces the word "one".

Assuming that the operator determines that the digit "1" is indeed to be dialled, he may actuate push button 3a a second time by exerting additional pressure thereon to depress push button 3a a further distance from its first depressed position. The additional pressure causes flexible circuit board 15 to deflect downwardly to bring the lower surface thereof into contact with actuator 31 of switch assembly 29 of second switch 5a. Thus, the lower surface of flexible circuit board 15 is now at level A, as illustrated in FIG. 2, and further depression of push button 3a forces actuator 31 downwardly against the resilient force of the spring within switch unit 30 to bring the lower surface of flexible circuit board 15 to level B. This closes switch 5a which supplies its respective second control signal to controller 6. Controller 6 is responsive thereto to cause apparatus control 9 to generate the conventional telephone dialling signal for the digit "1", and to cause the visual display of the digit "1" on display device 10.

Therefore, in accordance with the present invention, the driver of an automobile can actuate push button 3a from its rest position to a first depressed position detectable by touch alone and immediately receive audible identification of the operation selected. Thereafter, if he does not wish to proceed with the operation, he can release push button 3a, which is then urged upwardly to its rest position by convex portion 17. However, if he wishes the operation to be performed, he can then actuate push button 3a a second time by moving it downwardly to its fully depressed position, which causes the apparatus to perform the respective operation. In addition, a visual identification of the selected operation, in the discussed example the digit "1", is displayed on display device 10.

It will be appreciated that panel 13, rubber sheet 16, flexible board 15 and rigid board 28 may be common to all of the selection means 12. In that case, each pushbutton 3 will be slidable in a respective aperture of panel 13, sheet 16 will have a convex portion 17 for each push-button with a respective contact 19 thereon, a pair of contacts 22,23 will be provided on flexible sheet 15 in association with each contact 19, and, finally a switch assembly 29 will be provided on rigid board 28 for each push-button 3.

A flow chart of an appropriate control program 100 for controller 6 is illustrated in FIG. 4. As stated above, controller 6 may advantageously be embodied in the form of a micro-processor or micro-computer. When telephone 1 is turned on, that is, when electric power is supplied thereto, the micro-processor loads control program 100 in step 101 and proceeds to step 102, wherein it is determined whether any of first switches 4 is actuated. If not, control program 100 loops back along path 102*a* to remain at step 102 until one of first switches 4 is actuated. As stated above, switch arrays 2*b* and 2*c* are conventionally constructed to allow controller 6 to determine which first or second switches 4, 5 is actuated. At step 102, of course, only first control signals indicating a first switch 4 is actuated can be received. When such a first control signal is received, control program 100 moves on path 102*b* to step 103, wherein controller 6 supplies control signals to voice signal generator 7 to cause the same to generate the appropriate voice signal. Controller 6 identifies which first switch 4, for example, switch 4*a*, is actuated, and the voice signal contains this identification. Control program 100 then moves to step 104, wherein it is determined whether the associated second switch 5*a* is actuated within a predetermined time of the closing of first switch 4*a*. This time limit on actuation of second switch 5*a* is provided to allow an escape operation. The operator may decide not to perform the selected operation after hearing the audible identification thereof, and may release push button 3*a*, which is automatically urged back to its rest position. Under these circumstances, second switch 5*a* will not be actuated until first switch 4*a* is again actuated. If second switch 5*a* is not actuated within the predetermined time, control program 100 moves back along path 104*a* to step 102 to again await the actuation of one of first switches 4. However, if second switch 5*a* is actuated within the predetermined time, control program 100 moves along path 104*b* to step 105 wherein controller 6 supplies control signals to apparatus control 9 and the data entry portion thereof to cause the selected operation to be performed and to create the visual identification thereof on display device 10. Control program 100 then moves to step 106 to register the end of the operation and to return to step 102 to await the beginning of the next selection operation.

Although the above description relates to the application of the present invention to a telephone, it will be appreciated that the present invention could advantageously be embodied in many other types of electronic apparatus. When the present invention is embodied in a radio, the selected operations can correspond to the tuning of the radio to the broadcast frequency of a particular station stored in a memory of the radio. In such case, the audibly reproduced identification may consist of either the broadcast frequency or the call letters of the corresponding station. For each type of electronic apparatus embodying the present invention, the particular nature of the identification may be selected appropriately. For example, in operating a computer, the operator may be desirous of keeping his eyes on the screen at all times to watch for certain information. It may be significantly disadvantageous to require him to look at the keyboard he is operating. The apparatus according to the present invention may be embodied in such a computer with the externally detectable identification generated upon the first actuation of a selection means being displayed visually on the screen, rather than audibly. Thus, this externally detectable identification may be generated in any manner in which it is easily perceived without requiring the operator to look at the keyboard.

Alternate constructions of the selection means are of course possible. For example, flexible sheet 15 in first switch 4*a* may be replaced by a flexible circuit board, as is well known in the art.

The selection means could include a one stroke push button, that is, a push-button capable of movement through a single distance, with the first and second actuations being identical operations, and with the apparatus including a memory for remembering that the first actuation has occurred already and that the second actuation is now following the first actuation. Touch operated keys other than push buttons may also be used.

Synthesizers other than voice signal generator 7 may be used to provide musical tones or beeps audibly identifying the selected operation.

Although a specific embodiment of the present invention has been described in detail herein with reference to the accompanying drawings, it is to be understood that the invention is not limited to that precise embodiment, and that various changes and modifications may be effected therein by one skilled in the art without departing from the spirit and scope of the invention as defined in the appended claims.

We claim:

1. An electronic apparatus for selectively performing a plurality of operations, said apparatus comprising:
   a plurality of selectively actuable selection means for selecting respective ones of said operations;
   each said selection means being initially actuable to establish a first condition and being thereafter actuable to establish a second condition;
   means responsive to said first condition of each said selection means for generating an externally detectable identification of said respective one of the operations;
   means responsive to said second condition of each of said selection means for performing said respective one of the operations;
   each said selection means generating a respective first control signal when actuated to establish the respective first condition thereof and a respective second control signal when actuated to establish the respective second condition thereof;
   control means receiving said first and second control signals and being responsive to each said first control signal to cause said means for generating to generate said externally detectable identification of the respective operation, and being responsive to each said second control signal to cause said means for performing the respective operation; and
   visual display means, said control means being responsive to each of said second control signals to cause said visual display means to display an identification of the respective operation.

2. Apparatus according to claim 1, wherein said apparatus is a telephone.

3. Apparatus according to claim 1, wherein said control means includes microprocessor means.

4. Apparatus according to claim 1, wherein said means for generating includes synthesizer means and speaker means, said synthesizer means being responsive to said first condition of one said selection means to synthesize an identifying signal corresponding to the respective operation, and said speaker means being responsive to said identifying signal to audibly produce an identification of said respective operation.

5. Apparatus according to claim 4, further comprising visual display means responsive to said second condition of said one selection means for displaying an identification of said respective operation visibly.

6. Apparatus according to claim 4, wherein said synthesizer means includes voice synthesizer means, and wherein said identification is audibly produced in the form of words.

7. Apparatus according to 4, wherein said identification is audibly produced in the form of tones.

8. Apparatus according to claim 1, wherein each of said selection means includes an associated push button and switch means, said switch means being responsive to first and second actuations of said associated push button to establish said first and second conditions of said selection means, respectively.

9. Apparatus according to claim 8, wherein said switch means of each of said selection means includes first and second switches responsive to first and second actuations of the associated push button, respectively, to establish said first and second conditions of said selection means.

10. Apparatus according to claim 9, wherein each said push button is actuable from a rest position to a first depressed position to actuate the associated first switch, and is thereafter actuable from said first depressed position to a second depressed position to actuate the associated second switch.

11. Apparatus according to claim 10, wherein each said first and second switches includes first and second normally open electrical contacts, the associated push button being mechanically connected to said first and second switches to bring the first and second contacts of said first switch into electrical contact at said first depressed position, and to bring said first and second contacts of said second switch into electrical contact at said second depressed positon.

* * * * *